United States Patent [19]

Trott et al.

[11] 4,220,280

[45] Sep. 2, 1980

[54] MANURE SPREADER

[75] Inventors: Clarence R. Trott, Welland; Gerardus A. Veldhoven, St. Catherines; Dennis P. Chadwick, Hannon, all of Canada

[73] Assignee: Deere & Company, Moline, Ill.

[21] Appl. No.: 966,011

[22] Filed: Dec. 4, 1978

[51] Int. Cl.³ .................. A01C 15/12; A01C 15/16
[52] U.S. Cl. .................... 239/1; 91/189 R; 222/263; 222/626; 239/679; 414/511
[58] Field of Search ............ 239/661, 670, 1, 671–674, 239/676, 679, 681, 687; 222/252, 256, 263, 386, 626, 627; 414/509–511, 517; 241/280; 298/1 A, 1 B; 91/189 R

[56] References Cited

U.S. PATENT DOCUMENTS

| | | | |
|---|---|---|---|
| 3,207,382 | 9/1965 | Chappuis | 222/263 X |
| 3,682,333 | 8/1972 | Krause | 239/679 X |
| 4,069,982 | 1/1978 | Brackbill | 239/679 X |

FOREIGN PATENT DOCUMENTS

469431 9/1975 U.S.S.R. ................... 239/672

Primary Examiner—Andres Kashnikow

[57] ABSTRACT

A manure spreader having an upwardly opening box-like structure with a beater mechanism at its open rear end through which material may be reduced and thrown from that end. The conveying mechanism provided in the box-like structure for moving materials to the rear beater mechanism is composed of a fore-and-aft shiftable floor extension that is supported on a fixed floor of the box-like structure. The floor extension carries a transverse vertical push-off wall supported to shift fore-and-aft on the extension. In a fully extended position, the floor extension is at the front end of the spreader box and the push-off wall is on the front end of the extension. Manure or material in the box is pushed into the beater mechanism through hydraulic power which first shifts the floor extension rearwardly and in overlying rear position with respect to the fixed floor so that the rear edge of the floor extension is closely adjacent the beater mechanism. After the floor extension moves to its rear position, the hydraulic power then operates to move the push-off to a rear position so as to move the remaining material into the beater mechanism.

12 Claims, 7 Drawing Figures

MANURE SPREADER

BACKGROUND OF THE INVENTION

Heretofore it has been known to provide manure spreaders with a front transverse wall or push-off that moved from front to rear along the floor of the spreader box so as to push material into the beater mechanism where it is reduced and thrown from the rear open end of the spreader. Indeed, prior to the advent of suitable quality chains, this was the standard method of discharging manure from a spreader. With the advent of high quality floor chains, the general design of spreaders were changed so that fore-and-aft extending chains carried flighting which contacted the manure or other material in the box and shifted it rearwardly. Always, however, there have been problems of keeping the chains from corroding and from embedment in frozen materials. In recent years, therefore, there has been considerable interest shown in a return to the push-off type material discharge. This has occurred in one instance for the reason that as the manure spreaders became larger and larger, increased difficulty has been had with the chains which move the material to the beater mechanism at the rear of the spreader. Also, the use of a push-off generally maintains the box in a cleaner condition thereby requiring less manual cleaning of the box. Hydraulic cylinders have generally been used to move the push-offs between the front and rear end of the box. One of the problems with this latter type of discharge is that the hydraulic cylinders must be extremely long to move the push-off the entire length of the box thereby requiring considerable super structure forward of the box in order to provide space for the cylinder. In some instances, hydraulic cylinders have been used in combinations with chains and cables which are connected to the push-off so as to get some mechanical advantage which requires shorter hydraulic cylinders. However, in the latter case, there are the problems of maintaining the cables and chains and associated pulleys or sprockets clean and free of corrosion. Therefore, the latter create some of the problems that have existed with respect to the floor conveyor mechanisms.

SUMMARY OF THE INVENTION

With the above in mind, it is the primary purpose of the present invention to provide a manure spreader or material unloading implement which utilizes a box that is open at its rear end. The floor of the box is composed of front and rear sections and the front section is supported on the frame structure of the box so that it may shift into a rear overlying relation to the rear floor section. Supported within the box is a push-off that is mounted on the front floor section so that the push-off may move from the front portion of the front section to the rear end portion of the front section. In such an arrangement and upon the box being filled with material, the front section is moved rearwardly so as to gradually overlie the rear floor section. Since the push-off is at the front edge portion of the front section, the entire movement of the front section will move material into the rear beater mechanism. Following the completion of the rearward movement of the front section, the push-off is then shifted rearwardly with respect to the front section so that the material retained on the front section is moved into the beater mechanism.

It is a further object of the present invention to provide a unique arrangement of hydraulic cylinders composed of a first or main hydraulic cylinder that extends between the main frame of the implement and the movable front floor section which shifts the front section to and from overlying relation with the rear section. Coupled with this hydraulic cylinder is a second hydraulic cylinder that is shiftable with the front floor section and extends between the front floor section and the push-off mechanism. The two hydraulic cylinders are coupled by means of a valve arrangement which permits the first hydraulic cylinder to extend prior to the second hydraulic cylinder extending. Consequently, the sequence of unloading occurs through first moving the front floor section rearwardly and then moving the push-off rearwardly on the front section.

It is also an object of the present invention to provide a method of discharging manure in a spreader box through the first step of horizontally transporting rearwardly manure in the front portion of the spreader box to thereby simultaneously push that which is in the rear portion of the box into the beater mechanism followed by the step of then pushing the manure which was previously in the front portion into the beater mechanism.

DESCRIPTION OF THE PREFERRED EMBODIMENT

Figure 1:
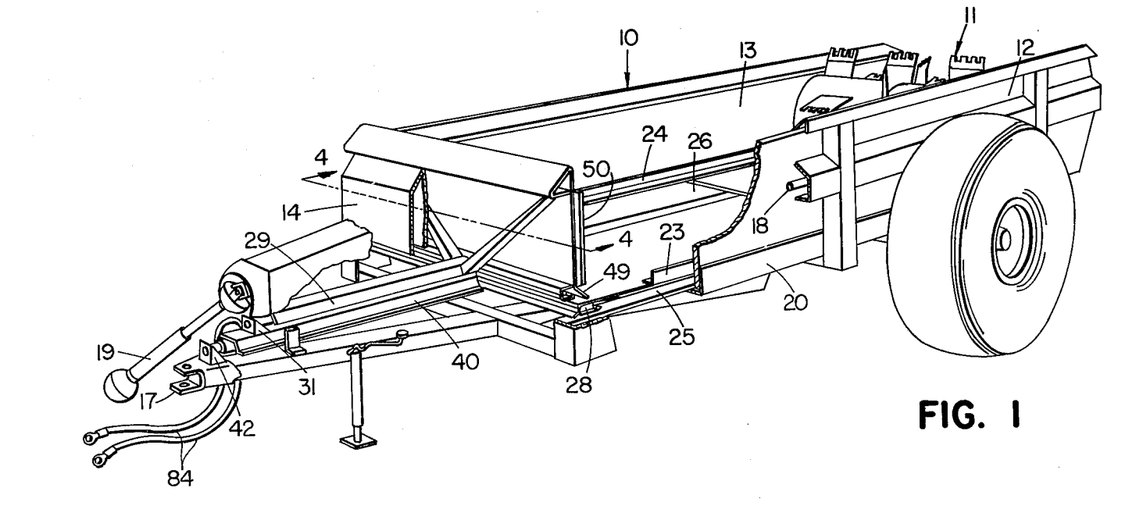
FIG. 1 is a front left perspective view of the manure spreader incorporating the features of the present invention with portions of the side removed to show operation of internal mechanism. In this view, the front and rear floor sections are fully extended.
Figure 2:
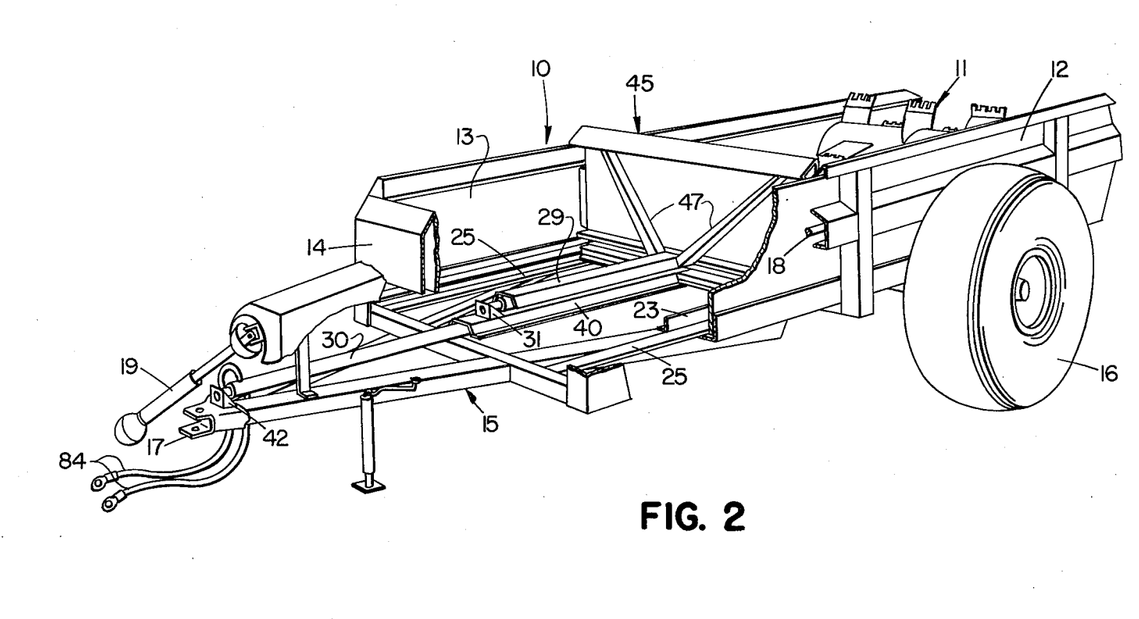
FIG. 2 is a view similar to FIG. 1 but showing the front floor section shifted rearwardly in overlying relation to the rear floor section.
Figure 3:
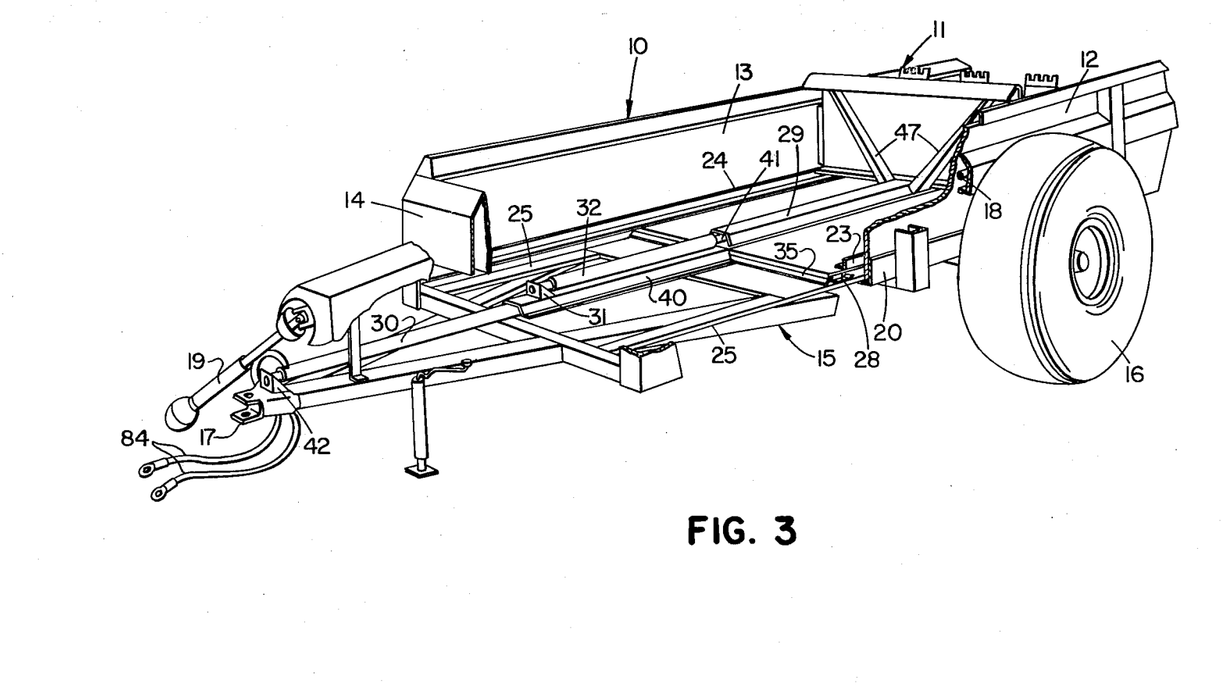
FIG. 3 is a view similar to FIG. 2 but having the front wall or push-off fully extended rearwardly.

Referring now to FIGS. 1, 2 and 3, the implement is composed of a box-like structure 10 open at its rear end except for a beater mechanism indicated in its entirety by the reference numeral 11, and composed of a pair of fore-and-aft extending upright side walls 12, 13 connected at their forward ends by a transverse front wall 14. The box 10 is mounted on suitable framework indicated in its entirety by the reference numeral 15 which in turn is carried on a pair of rear transport wheels, the left wheel being shown at 16. As may be seen, the framework 15 extends considerably forward of the box structure 10 and is provided at its forward end with a clevis-type connection 17 for connecting the implement to a suitable drawbar on a tractor. The beater mechanism 11 is driven through a beater drive shaft 18 which is mounted alongside the left wall 12. The forward end of the beater drive shaft connects through a suitable corner drive extending around the forward end of the implement and is drivingly connected to a power drive shaft 19 which is capable of connection to the power take-off shaft on a conventional-type tractor. The drive to the beater mechanism 11 may be of any of a number of conventional drives and serves no purpose with respect to the present invention other than to indicate that the beater mechanism 11 is driven so as to reduce and to discharge material rearwardly through the open end of the box.

The framework 15 includes a pair of fore-and-aft extending angle iron members 20, 21 which extend the full length of the spreader box and serve as the basic support for the respective side walls 12, 13. The side walls 12, 13 are made of laminated wood material with an inner surface of hard plastic which permits material moving lengthwise along the walls 12, 13 to slide easily along the plastic surfaces. The horizontal portions of the angle iron members 20, 21 support a rear and fixed horizontal floor section 22 which extends fully across the box or implement and covers substantially the rear two-thirds of the box. The rear floor portion or section 22 is fixed against movement and terminates closely adjacent the beater mechanism 11. As may clearly be seen from viewing FIGS. 2 and 3, the rear floor section 22 terminates at a forward transverse edge or end substantially between a third and one-half of the distance between the front and the rear end of the spreader box. Fixed to the internal surfaces of the walls 12, 13 are a pair of angle irons 23, 24. Beneath the angle irons 23, 24 and at opposite sides of the box are metal floor supports 25, substantially the same thickness as floor section 22, which extend forwardly from the forward edge of floor section 22 to the front of the spreader box. The floor supports 25 are fixed to the upper surface of the horizontal portions of angle irons 20, 21. The floor of the box also includes a front floor section or extension composed of a floorboard 26 that is carried on a horizontal frame structure 27. At opposite transverse ends and at the fore-and-aft corners of the frame structure are pads 28 that ride on the surfaces of the floor panel 22 and the floor supports 25. A fore-and-aft extending and centrally located channel 40 runs the full length of the floor extension 26 and has a forwardly extending portion that serves in part as a cylinder guard covering a first or main hydraulic cylinder 30, details of which will be later described. The guard portion also serves as a structural member and carries at its forwardmost end a cylinder bracket 31 that anchors a second or push-off cylinder 32, details of which will also be later described.

At the rear edge of the floor extension 26 is a pair of upright metal plates 33, 34 that are fixed to the respective pads 28 at those corners and which fill the spacing between the upper surface of the fixed floor 22 and the undersurfaces of the angle irons 23, 24. Thus, the floor extension 26 is limited in vertical movement with respect to the lower surface 22. Provided on the forward and rear edges of the floor extension or structure 26 are downwardly inclined scraper plates 35, 36 respectively. They extend across the unit and tend to raise or clean material off the surface of floor 22. It should here be noted that both floor sections are of laminated construction having upper hard plastic surfaces. Consequently, material moving over them will slide relatively easily and will tend to clean the floor sections as the material moves. Since the fixed or rear floor section 22 extends substantially two-thirds the length of the box, the movable floor extension 26 is substantially one-third the length of the box.

A rod 41 of the cylinder 30 is connected to the forward end of the extension floor structure so that the extension 26 moves fore-and-aft with respect to the spreader box and between a rear overlying position with respect to the fixed floor 22 to a fully extended position in which the floor extension 26 fills the gap between the forward edge of the fixed floor 22 and the forward end of the spreader box. The cylinder 30 is mounted on the forwardly projecting portion of the main frame 15 adjacent the clevis at the forward end of the frame. An upwardly projecting bracket 42 is provided for the purpose of connecting the cylinder to the main frame 15.

A vertical wall or push-off indicated in its entirety by the reference numeral 45 is provided at the forward end of the spreader. The push-off 45 is composed of a front sheet metal panel 46 braced on its front side by upwardly diverging vertical braces or struts 47. Bolted to and extending transversely outwardly from the opposite vertical edges of the panel 46 is a pair of flexible rubber wiper blades 50, 51 that bear against and wipe the surfaces of the upright walls 12, 13. Floor engaging pads 52, 53 are provided on opposite ends of the push-off 48 and engage the surface of floor 26. The lower centrally located ends of the braces 47 are fixed to a horizontal downwardly opening channel 29 serving as a guard for cylinder 32 which projects forwardly from the push-off structure 45. The rod end of cylinder 32 is connected to the push-off 45 by means of a cross pin 55. Therefore, as the cylinder 32 extends the rod 54 pushs the push-off 45 toward the rear of the spreader and on the floor 26. As explained previously, the channel member 40 is cantilevered from and is part of the floor extension structure 26. Consequently, the channel 40 moves with the floor 26 as the cylinder 30 is extended. In operation, therefore, the cylinder 32 and the push-off 45 move with the floor 26 as the cylinder 30 is extended or retracted. The push-off 45 may also move relative to the floor 26 through extension and retraction of the cylinder 32.

Figure 4:
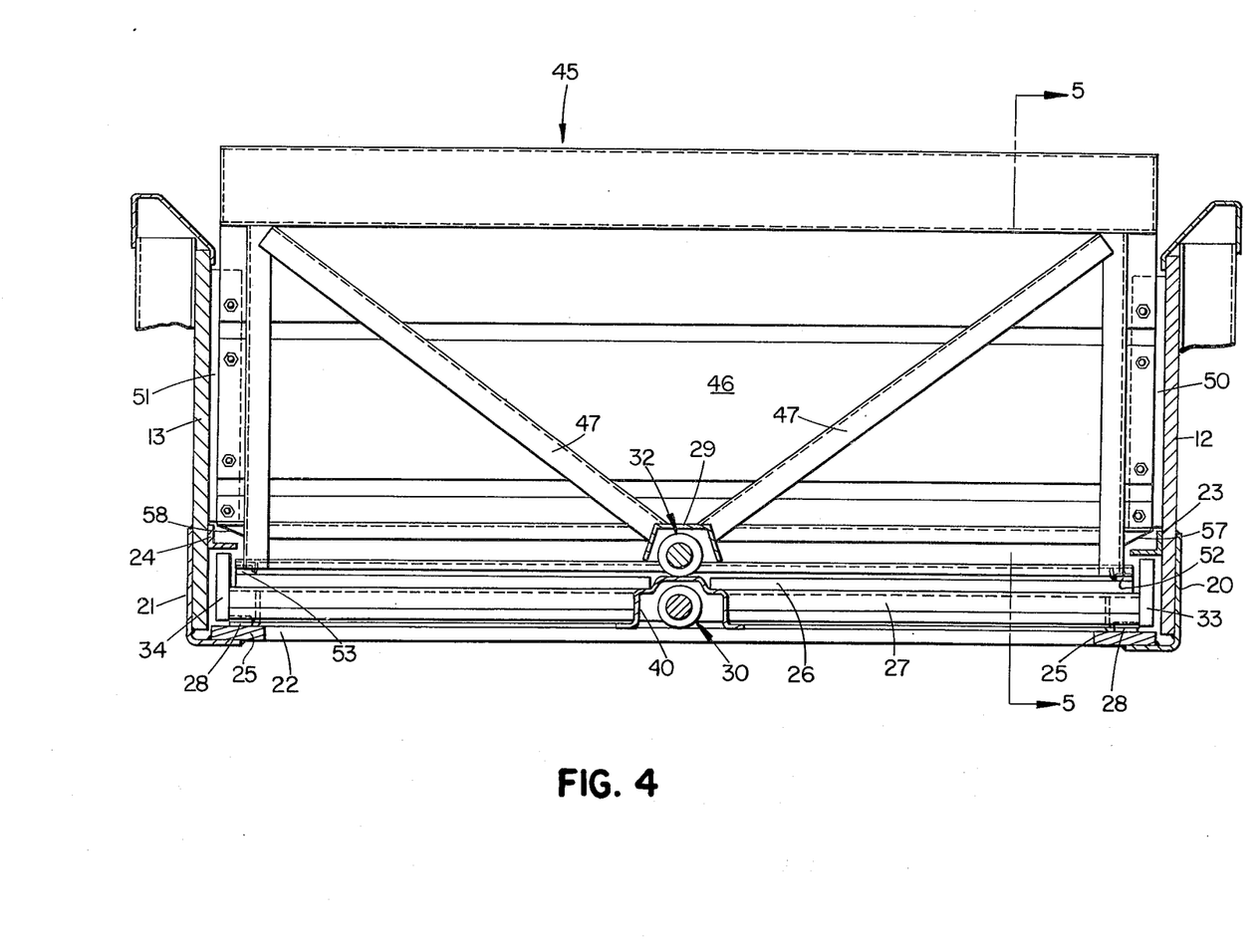
FIG. 4 is a front view of the spreader box taken just rearwardly of the front fixed wall of the spreader box and substantially along the lines 4—4 of FIG. 1.
Figure 5:
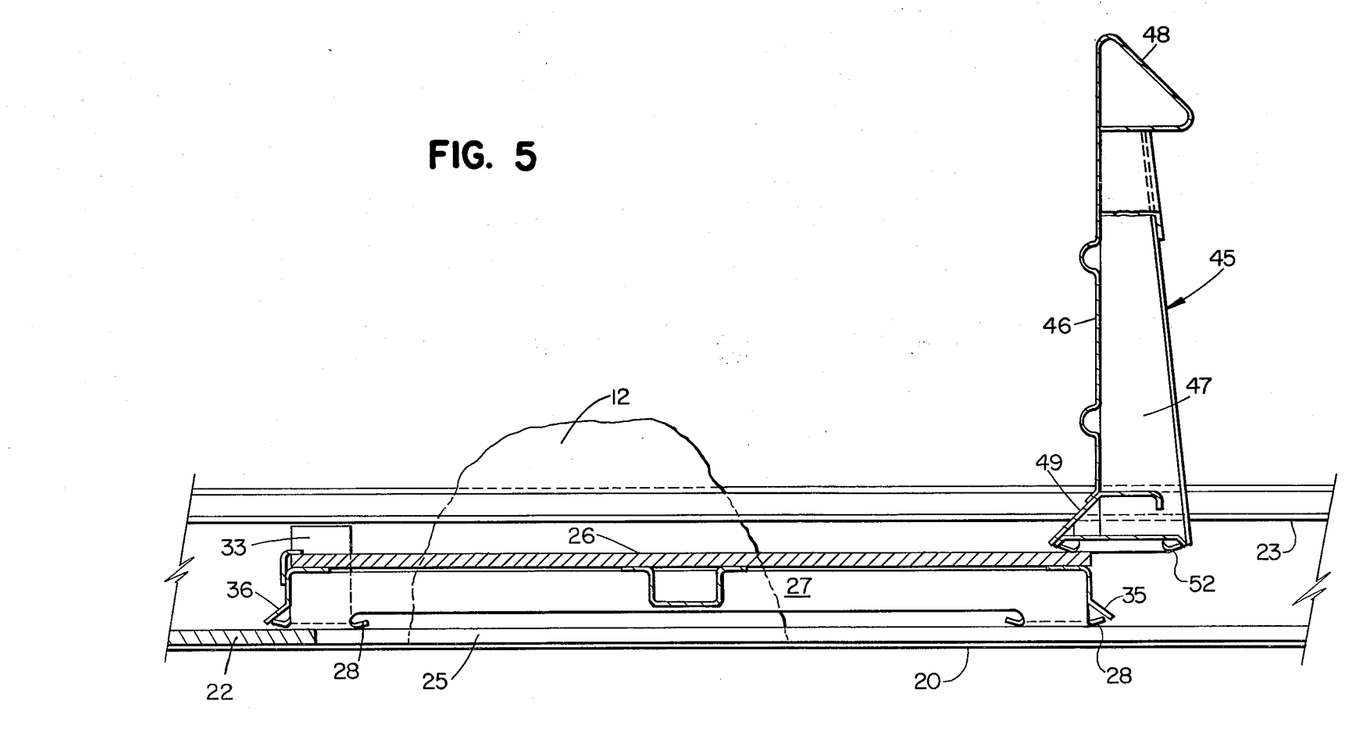
FIG. 5 is a sectional view taken substantially along the lines 5—5 of FIG. 4 and with the floor and push-off wall in their full front positions.
Figure 6:
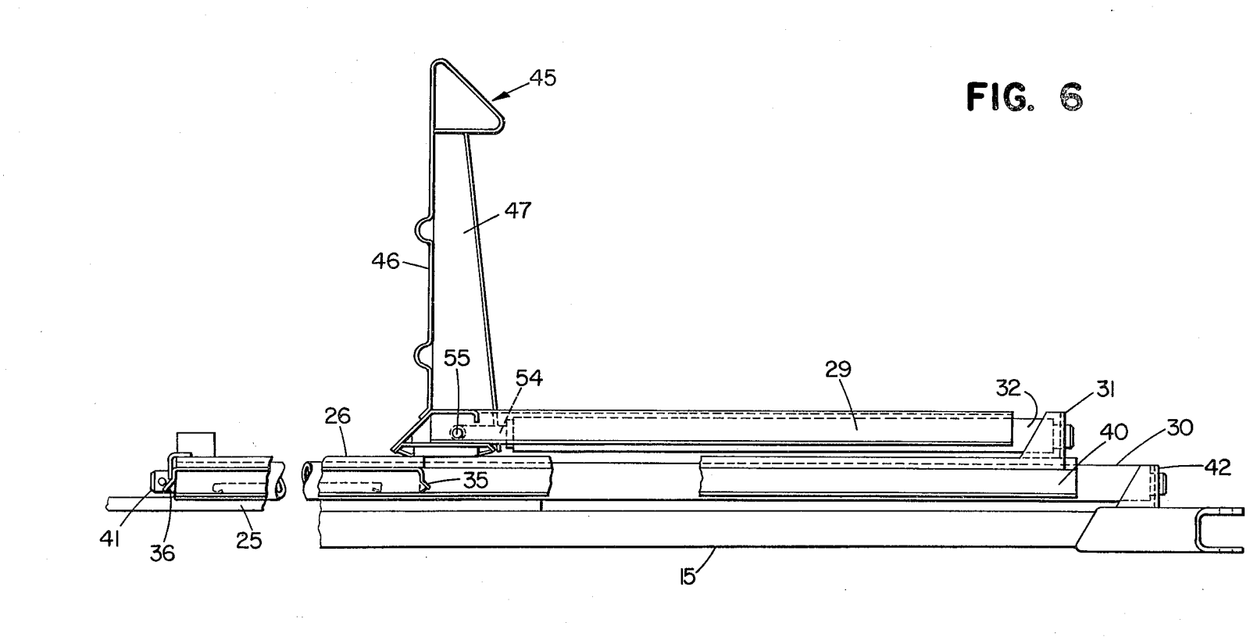
FIG. 6 is a reduced size view showing the cylinder arrangements and their supports when the floor is in its extended position and the push-off is in its fully retracted position.

Referring again to FIG. 4, the push-off panel 46 has notches or recesses 57, 58 adjacent the lower portions of its outer vertical edges. The notches receive the angle irons 23, 24. Consequently, the angle irons 23, 24 not only limit vertical movement of the floor panel 26 by limiting the amount of vertical movement that the upright plates 33, 34 may have, but also limit vertical movement of the push-off 45. It should here be noted that the very nature of the design of both the floor extension and the push-off is such that the weight of material in the box will tend to hold the floor extension 26 into substantial engagement with the fixed floor 22 as well as to hold the push-off in engagement with the surface of the floor 26.

Figure 7:
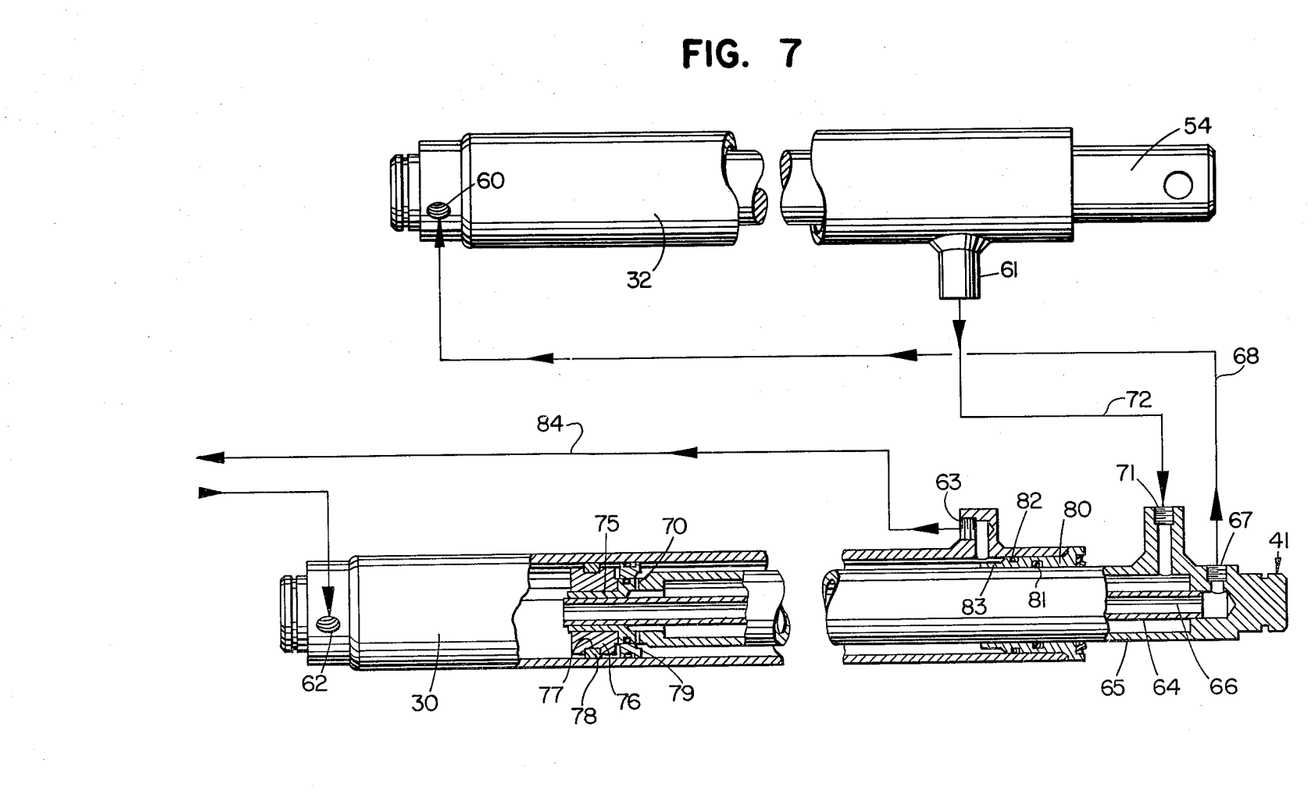
FIG. 7 is a view, partially in section and partially schematic, showing the main and auxiliary cylinders that operate the front floor extension section and push-off, respectively.

Referring now more specifically to FIG. 7 which shows the construction of the respective hydraulic cylinders, it should first be noted that the cylinder 32 and rod 54 form a conventional two-way cylinder having fluid inlets 60, 61 opening into the closed end and the rod end of the respective cylinder 32. The main cylinder 30 has fluid passages 62, 63 opening into the closed end and the rod end of the cylinder 30. The rod 41 is of unique design and is composed of inner and outer tubular members 64, 65 respectively that are sealed at their respective opposite ends so that fluid cannot move from one tube to the other. The opening 66 of tube 64 opens into the closed end of cylinder 30 and has a fluid port 67 opening into a fluid passage 68 leading to the inlet 60 of cylinder 32. The tube 65 has a series of radial ports 70, opening into the cylinder 30, which permits passage of fluid between the cylinder 30 and the internal area of the tube 65. A port 71 is provided to permit passage of fluid from the tubes 65 through a fluid line 72 which opens into the fluid inlet 61 of cylinder 32. It will be noted that both the fittings 67, 71 are external of the cylinder 30. The tube 65 is necked down at 75 and receives a collar 76. The collar 76 has an external groove 77 in which is seated a wear ring 78 that extends from the collar 76 to the internal surface of the cylinder 30. It should here be noted that the ring 78 does not prevent passage of fluid between opposite sides of the ring. Supported externally of the tube 65 and adjacent the collar 76 is a shuttle valve 79 which shifts axially to open and close the ports 70.

At the rod end of the cylinder 30, there is provided an annular head that seals the end of the cylinder chamber, O-rings 81, 82 being provided so as to seal the end or head 80 against leakage. The collar or sealing ring 80 has a projecting portion 83 that extends axially beyond the opening to the outlet 63. As may clearly be seen, the projecting portion 83 is positioned so that, upon the rod assembly 41 moving to its full extended position, it will contact the shuttle valve 79. The valve 79 has rings thereon that seal against the inner surface of cylinder 30. The valve 79, therefore, not only operates as a valve, but also serves as a part of the piston when it reaches either of its axial positions.

The hydraulic cylinder assembly operates in the following manner in conjunction with the manure spreader. Assuming that the floor 26 is fully extended and that the push-off 45 is moved to its extreme forward position, both cylinders 30, 32 will be completely retracted. Fluid is introduced into the opening 62 and into the chamber of the cylinder 30. The return line 84 is opened to permit fluid to move through the outlet 63. Fluid will move by the collar 76 and ring 78 and into engagement with the end of the shuttle valve 79 causing it to slide axially on the recess portion of the outer tube 65 to an overlying position with respect to the ports 70. This will block movement of fluid through the outer tube 65, its port 71, the passage or line 72 and from the rod end of the cylinder 32. Thus, movement of the rod 54 and the cylinder 32 is prevented. However, as fluid is continued to be moved through the inlet 62, the rod assembly 41 will extend or shift to the right which in turn will shift the floor 26 toward its rearwardmost position. As the rod assembly advances towards its extreme or fully extended position, the projecting portion 83 of head 80 will contact the shuttle valve 79 causing it to uncover the ports 70. Fluid then moves out of cylinder chamber 30, through the opening 66, out the discharge passage 67, line 68 and into the closed end of the cylinder 32 by inlet 60. Since the ports 70 are now opened, discharge fluid may move through the outlet 61, line 72, passage 71, tube 65, and through the return line 84 to the tractor reservoir. This movement of fluid extends the rod 54 which causes the vertical push-off wall to shift rearwardly toward the rearmost edge of the floor extension 26. When it is desired to retract both the cylinders 32 and 30 which will first retract the push-off to its forwardmost position with respect to the floor 26 and then retract the floor 26 to its forwardmost position, the flow of fluid through the two inlets 63, 62 are reversed by a suitable valve, not shown, but which is conventional on present day tractors. Since it appears that operation of the respective rods and cylinders is rather obvious by the reversal of fluid, details of the operation, when reversing the fluid, will not be given.

In actual operation, movement of manure occurs in an initial stage by carrying the amount that is on the front floor extension 26 rearwardly as the main cylinder 30 extends. The manure on the front extension 26 and the rear edge of the floor extension 26 pushes that which is on the rear or fixed floor 22 rearwardly into the beater mechanism 11. Following the floor extension 26 moving to the rearmost position is the second stage of discharging manure by moving the push-off 45 rearwardly. There must be sufficient thickness in the total floor extension structure composed of floor 26 and its frame 27 to begin or initiate the shifting rearwardly of the manure on the fixed floor 22. This total two-stage discharge operation is important since it would be most difficult to push the manure, for example, the full length of the box by a single push-off. There would exist too much friction and the manure would be compressed rather than pushed rearwardly. Therefore, by having the two-stage discharge, the capacity of the spreader may be increased or the spreader box may be considerably longer as compared to a spreader box in which only a push-off is used.

We claim:

1. A method of discharging manure in a spreader box through a beater mechanism at the rear end of the box comprising: transporting manure in the forward portion of the box horizontally rearwardly to thereby simultaneously push the manure in the rear portion of the box into the beater mechanism by shifting the floor portion and the wall at the forward portion of the box rearwardly; and after the manure in the rear portion has been discharged through the beater mechanism pushing that which was previously in the front portion and on said floor portion through the beater mechanism by shifting said wall rearwardly with respect to said floor portion.

2. A material-handling implement comprising: a material-containing box open at its rear end and having transversely spaced upright sides, and a floor composed of front and rear sections, the former of which is supported to shift rearwardly to overlie the latter; a transverse beater mechanism supported on the box at its open rear end; a vertical transversely extending wall substantially the height of the box and extending between the side walls, said vertical transversely extending wall being supported in the box to shift fore-and-aft with respect to and between the front and rear portion of the front section of the floor; and hydraulic cylinder means connected to the front section and between the front section and front wall for shifting the front section to overlying position with respect to the rear floor section and in which the rear portion of the front floor portion is closely adjacent the beater means and for shifting the vertical wall rearwardly on the front floor section to and from the rear portion thereof.

3. The invention defined in claim 2 in which the sidewalls and floor sections have plastic coated interior surfaces over which material may slide.

4. The invention defined in claim 3 further characterized by flexible wiper blades fixed on opposite transverse ends of the vertical wall for engagingly wiping the plastic interior surfaces of the spaced upright sides.

5. A material-handling implement comprising: a material-containing box open at its rear end and having transversely spaced upright sides, and a floor composed of front and rear sections, the former of which is supported to shift rearwardly to overlie the latter; a transverse beater mechanism supported on the box at its open rear end; a vertical transversely extending wall supported in the box to shift fore-and-aft with respect to and between the front and rear portion of the front section of the floor; hydraulic cylinder means connected to the front section and between the front section and front wall for shifting the front section to overlying position with respect to the rear floor section and in which the rear portion of the front floor portion is closely adjacent the beater means and for shifting the vertical wall rearwardly on the front floor section to and from the rear portion thereof; and valve means for operating the cylinder means for sequentially shifting the front section rearwardly into overlying relation with respect to the rear section followed by shifting the vertical wall rearwardly with respect to the front floor section.

6. The invention defined in claim 5 further characterized by said valve means operating the cylinder means for sequentially returning the vertical wall forwardly with respect to the front floor section followed by returning the front section forwardly to its extended position with respect to the rear floor section.

7. A material-handling implement comprising: a main mobile frame including a forwardly projecting hitch structure for connection to a tractor; a material-containing box supported on the frame open at its rear end and having transversely spaced upright sides, and a floor composed of front and rear sections, the former of which is supported to shift rearwardly to overlie the latter and which has a rigid forwardly projecting cylinder-supporting structure; a transverse beater mechanism supported on the box at its open rear end; a vertical transversely extending wall supported in the box to shift fore-and-aft with respect to and between the front and rear portion of the front section of the floor; a main fore-and-aft extending hydraulic cylinder extending between the hitch structure and the front section for shifting the front section to and from overlying position with respect to the rear floor section and in which the rear portion of the front floor portion is closely adjacent the beater means; and a push-off cylinder extending between said rigid forwardly projecting cylinder-supporting structure and vertical wall for shifting the vertical wall rearwardly on the front floor section to and from the rear portion thereof.

8. In a material-unloading implement having an upwardly opening box-like structure with front and rear ends with opposite fore-and-aft extending vertical sides extending between the front and rear ends and a floor structure extending between the sides with a forward transverse end offset rearwardly from the front end, and a transverse beater mechanism at the rear end for reducing materials as they are discharging from the rear end, the improvement residing in conveying mechanism supported in the box-like structure for moving materials rearwardly in the structure for engagement with the beater mechanism comprising: a floor extension supported in the box-like structure to shift with respect to the floor structure between a rear overlying position and a forward extension of the floor structure; a transverse vertical push-off wall supported to shift fore-and-aft between front and rear positions on the floor extension; a first hydraulic cylinder connected to the floor structure and floor extension for shifting the extension to and from its overlying position; a second hydraulic cylinder connected to the floor extension and push-off wall for shifting the latter between its front and rear positions; and valve means operatively connected to the first and second hydraulic cylinders for sequentially shifting in a rearward direction the floor extension to its overlying position followed by shifting the push-off to its rear position and for reversing said cylinders to first shift the push-off to its front position followed by shifting the floor extension to its position of forward extension with respect to the floor structure.

9. A manure spreader comprising: a rearwardly opening material container composed of a pair of vertical fore-and-aft extending sidewall structures joined at their forward ends by a transverse connecting structure; a fixed floor terminating at its rear end near the rear ends of the sidewalls and at its forward end in fore-and-aft spaced relation with the transverse connecting structure so as to define an open gap therebetween; a movable horizontal floor supported to slide fore-and-aft on the sidewall structures between an extended position in which it closes the gap and a retracted position in which it overlies the fixed floor; a vertical transverse push-off wall substantially the height of and extending between and engaging the respective sidewall structures at the forward end of the container and movable fore-and-aft with respect to the movable floor; a first hydraulic cylinder connected to the movable floor for shifting the latter between its extended and retracted positions; and a second hydraulic cylinder connected to the vertical transverse push-off wall for shifting the latter fore-and-aft relative to the movable floor.

10. A manure spreader comprising: a pair of vertical fore-and-aft extending sidewall structures joined at their forward ends by a transverse connecting structure and at their rear ends by a transverse beater mechanism; a fixed floor terminating at its rear end near the beater mechanism and at its forward end in fore-and-aft spaced relation with the transverse connecting structure so as to define an open gap therebetween; a movable horizontal floor supported to slide fore-and-aft on the sidewall structures between an extended position in which it closes the gap and a retracted position in which the movable and fixed floors are in overlying relation with one another; a vertical transverse push-off wall substantially the height of and extending between and engaging the respective sidewall structures at the forward end of the container and movable fore-and-aft with respect to the movable floor; a first hydraulic cylinder connected to the movable floor for shifting the latter between its extended and retracted positions; and a second hydraulic cylinder connected to the vertical transverse push-off wall for shifting the latter fore-and-aft relative to the movable floor.

11. The invention defined in claim 10 in which said transverse connecting structure is a wall-like structure having a lower edge vertically offset from the level of the movable floor.

12. The invention defined in claim 10 further characterized by transverse downwardly inclined scraper blades mounted on opposite transverse edges of the movable floor.

* * * * *